(12) United States Patent
Koizumi et al.

(10) Patent No.: US 7,538,810 B2
(45) Date of Patent: May 26, 2009

(54) SOLID-STATE IMAGE PICKUP DEVICE AND CONTROL METHOD THEREOF, AND CAMERA

(75) Inventors: Toru Koizumi, Yokohama (JP); Akira Okita, Yamato (JP); Katsuhito Sakurai, Machida (JP); Isamu Ueno, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 639 days.

(21) Appl. No.: 11/332,734

(22) Filed: Jan. 13, 2006

(65) Prior Publication Data

US 2006/0158539 A1    Jul. 20, 2006

(30) Foreign Application Priority Data

Jan. 14, 2005    (JP)    ............................. 2005-008124

(51) Int. Cl.
     *H04N 3/14*      (2006.01)
(52) U.S. Cl. ..................................................... 348/308
(58) Field of Classification Search ................... 348/308
See application file for complete search history.

(56) References Cited

U.S. PATENT DOCUMENTS

| | | | |
|---|---|---|---|
| 5,698,892 A | 12/1997 | Koizumi et al. | ............. 257/620 |
| 6,064,431 A | 5/2000 | Ueno | ........................ 348/241 |
| 6,188,094 B1 | 2/2001 | Kochi et al. | ................. 257/232 |
| 6,307,195 B1 | 10/2001 | Guidash | .................. 250/208.1 |
| 6,342,920 B2 | 1/2002 | Ueno | ........................ 348/303 |
| 6,605,850 B1 | 8/2003 | Kochi et al. | ................. 257/431 |
| 6,636,261 B1 * | 10/2003 | Pritchard et al. | ............. 348/308 |
| 6,670,990 B1 | 12/2003 | Kochi et al. | ................. 348/310 |
| 6,850,278 B1 | 2/2005 | Sakurai et al. | ............... 348/302 |
| 6,946,637 B2 | 9/2005 | Kochi et al. | ............... 250/208.1 |
| 6,960,751 B2 | 11/2005 | Hiyama et al. | ............ 250/208.1 |

(Continued)

FOREIGN PATENT DOCUMENTS

EP    0 275 217 A2    7/1988

(Continued)

OTHER PUBLICATIONS

English translation of JP-2003-134396, May 2003 Watanabe et al.*

(Continued)

*Primary Examiner*—James M Hannett
(74) *Attorney, Agent, or Firm*—Fitzpatrick, Cella, Harper & Scinto (57) ABSTRACT

An object of the invention is to cause a part of charge spilling from a photoelectric conversion unit to flow into a charge holding unit and thereby extend dynamic range and at the same time improve image quality. There is provided a solid-state image pickup device having a pixel including: a photoelectric conversion unit generating and accumulating charge by means of photoelectric conversion; a first charge holding unit being shielded from light, and being adaptable to accumulate a part of charge spilling from the photoelectric conversion unit in a period during which the photoelectric conversion unit generates and accumulates charge; an amplifying unit (SF-MOS) amplifying charge; a first transfer unit (Tx-MOS) transferring the charge accumulated in the photoelectric conversion unit to the amplifying unit; and a second transfer unit (Ty-MOS) transferring the charge accumulated in the first charge holding unit to the amplifying unit.

7 Claims, 9 Drawing Sheets

U.S. PATENT DOCUMENTS

| | | | |
|---|---|---|---|
| 7,016,089 B2 | 3/2006 | Yoneda et al. | 358/482 |
| 7,110,030 B1 | 9/2006 | Kochi et al. | 348/308 |
| 7,187,052 B2 | 3/2007 | Okita et al. | 257/444 |
| 2003/0164887 A1 | 9/2003 | Koizumi et al. | 348/308 |
| 2003/0189656 A1 | 10/2003 | Shinohara | 348/272 |
| 2004/0041077 A1* | 3/2004 | Fossum | 250/208.1 |
| 2005/0122418 A1 | 6/2005 | Okita et al. | 348/340 |
| 2005/0168618 A1 | 8/2005 | Okita et al. | 348/335 |
| 2005/0174552 A1 | 8/2005 | Takada et al. | 355/53 |
| 2005/0179796 A1 | 8/2005 | Okita et al. | 348/308 |
| 2005/0185074 A1 | 8/2005 | Yoneda et al. | 348/294 |
| 2005/0268960 A1 | 12/2005 | Hiyama et al. | 136/244 |
| 2005/0269604 A1 | 12/2005 | Koizumi et al. | 257/29 |
| 2006/0027843 A1 | 2/2006 | Ogura et al. | 257/291 |
| 2006/0043261 A1 | 3/2006 | Matsuda et al. | 250/208.1 |
| 2006/0043393 A1 | 3/2006 | Okita et al. | 257/93 |
| 2006/0043439 A1 | 3/2006 | Koizumi | 257/291 |
| 2006/0044434 A1 | 3/2006 | Okita et al. | 348/294 |
| 2006/0157759 A1 | 7/2006 | Okita et al. | 257/292 |
| 2006/0158539 A1 | 7/2006 | Koizumi et al. | 348/300 |
| 2006/0158543 A1 | 7/2006 | Ueno et al. | 348/308 |
| 2006/0208161 A1 | 9/2006 | Okita et al. | 250/208.1 |
| 2006/0208291 A1 | 9/2006 | Koizumi et al. | 257/292 |
| 2006/0208292 A1 | 9/2006 | Itano et al. | 257/292 |
| 2006/0221667 A1 | 10/2006 | Ogura et al. | 365/149 |

FOREIGN PATENT DOCUMENTS

| | | |
|---|---|---|
| EP | 0 400 985 A2 | 12/1990 |
| JP | 2000-165754 | 6/2000 |
| JP | 2000-165755 | 6/2000 |
| JP | 2000-165755 A | 6/2000 |
| JP | 2003-134396 * | 5/2003 |
| JP | 2004-335803 | 11/2004 |

OTHER PUBLICATIONS

Chinese Office Action issued Jul. 6, 2007 for Application No. 200610005135.2.

Decker, S. et al., "A 256×256 CMOS Imaging Array with Wide Dynamic Range Pixels and Column-Parallel Digital Output," IEEE Journal of Solid-State Circuits, Piscataway, NJ, Dec. 1998, vol. 33; No. 12, pp. 2081-2090.

* cited by examiner

FIG. 1

FIG. 2A
PHOTOELECTRIC
CONVERSION UNIT

FIG. 2B
CHARGE HOLDING
UNIT

SOLID-STATE IMAGE PICKUP DEVICE AND CONTROL METHOD THEREOF, AND CAMERA

BACKGROUND OF THE INVENTION

1. Field of the Invention

The present invention relates to a solid-state image pickup device, a control method thereof and a camera.

2. Related Background Art

In U.S. Pat. No. 6,307,195, there is described a solid-state image pickup device in which charge spilling from a photodiode during accumulation of photoinduced charge flows into a floating diffusion (FD) via a transfer gate (TG). By reading out the charge flowing into the FD, dynamic range is extended.

The capacity of FD, contributing to the amplification factor of an amplifying unit, cannot have a large value. Accordingly, only a small amount of charge spilling from the photodiode (PD) unit functioning as a photoelectric conversion unit can be accumulated. Also, the PD is connected to the input unit of the amplifying unit within a pixel, so the FD cannot have a perfectly buried structure. Here, "buried structure" means a structure having a reverse conducting-type impurity diffusion region formed on the surface of an impurity diffusion region for forming an FD. With such structure, the generation of dark current on the surface of the impurity diffusion region for forming an FD is reduced. Consequently, the dark current in the impurity region for forming an FD is larger than that in the photoelectric conversion unit. Accordingly, the FD is not suitable for a node holding data. Charge spilling into the FD is lost as time passes, so a high S/N ratio cannot be expected for a signal from the high brightness portion.

In Japanese Patent Application Laid-Open No. 2004-335803, there is described a MOS solid-state image pickup device in which a plurality of light receiving units are arranged in an array on the surface of a semiconductor substrate and a signal at each light receiving unit is read out on a per light receiving unit basis, each said light receiving unit being provided with a first signal charge detecting unit for detecting a signal dependent on the amount of incident light, and a second signal charge detecting unit for capturing a part of excess carrier of the first signal charge detecting unit when the detection signal at the first signal detecting unit saturates and thereby detecting a signal dependent on the amount of captured charge.

According to Japanese Patent Application Laid-Open No. 2004-335803, as shown in the accompanying FIG. 2, there is provided the second signal charge detecting unit 38 which detects a part of saturating electron when the saturation of electron generated in the first signal charge detecting unit 31 occurs. Part of excessive carrier is captured and the rest is drained out to a vertical type overflow drain (OFD). The first and second signal detection units are separately provided.

However, to dump one part to the vertical type OFD and collect the rest into the second signal charge detecting unit 38, there is needed a technique for fabricating with considerably high accuracy both the potentials of a barrier unit 33 and the vertical type OFD. When this accuracy is not sufficient, a variation in the flowing-in amount between the vertical type OFD and the detection unit occurs. Accordingly, the flowing-in ratio varies according to sample, thus significantly reducing mass productivity.

Also, the charge dumping side has a structure of vertical type OFD, and the charge capturing side has a structure of horizontal type OFD. Thus barriers having a different structure must be exceeded in each side. More specifically, the spilling ratio is controlled by potential barriers based on density profiles determined by a different semiconductor process. In addition, the amount of spilling-out current typically varies exponentially relative to potential controlling voltage. Consequently, it may be difficult to control the spilling ratio finely and highly accurately. From the above described reason, there is also a drawback that the flowing-out ratio between the vertical type OFD and horizontal type OFD has a temperature dependence.

Furthermore, the vertical type OFD determines the saturation charge of PD. Accordingly, the range where the potential can be controlled is considerably limited. Practically, to compensate for this, it is essential for the horizontal type OFD structure to have a potential controlling mechanism. This causes problems of increased false signal (dark current) at a dark state, reduced yield associated with an increasing number of control lines, and the like.

An object of the present invention is to cause a part of the charge spilling from a photoelectric conversion unit to flow into a charge holding unit and thereby extend dynamic range and at the same time improve image quality.

SUMMARY OF THE INVENTION

A solid-state image pickup device according to the present invention has a pixel comprising: a photoelectric conversion unit generating and accumulating charge by means of photoelectric conversion; a first charge holding unit being shielded from light, and being adaptable to accumulate a part of charge spilling from the photoelectric conversion unit in a period when the photoelectric conversion unit generates and accumulates charge; an amplifying unit amplifying charge; a first transfer unit transferring the charge accumulated in the photoelectric conversion unit to the amplifying unit; and a second transfer unit transferring the charge accumulated in the first charge holding unit to the amplifying unit.

A solid-state image pickup device control method according to the present invention is a method for controlling a solid-state image pickup device which has a pixel comprising: a photoelectric conversion unit for generating and adaptable to accumulate charge by means of photoelectric conversion; a first charge holding unit light-shielded for accumulating a part of charge spilling from the photoelectric conversion in a period when the photoelectric conversion unit generates and accumulates charge; and an amplifying unit for amplifying charge, wherein charge is transferred in such a way that a path for transferring the charge accumulated in the photoelectric conversion unit to the amplifying unit is different from that for transferring the charge accumulated in the first charge holding unit to the amplifying unit.

A camera according to the present invention comprises: the solid-state image pickup device; a lens focusing an optical image on the solid-state image pickup device; and an aperture varying the amount of light passing through the lens.

Other features and advantages of the present invention will be apparent from the following description taken in conjunction with the accompanying drawings, in which like reference characters designate the same or similar parts throughout the figures thereof.

The accompanying drawings, which are incorporated in and constitute a part of the specification, illustrate embodiments of the invention and, together with the description, serve to explain the principles of the invention.

DESCRIPTION OF THE PREFERRED EMBODIMENTS

First Embodiment

Figure 1:
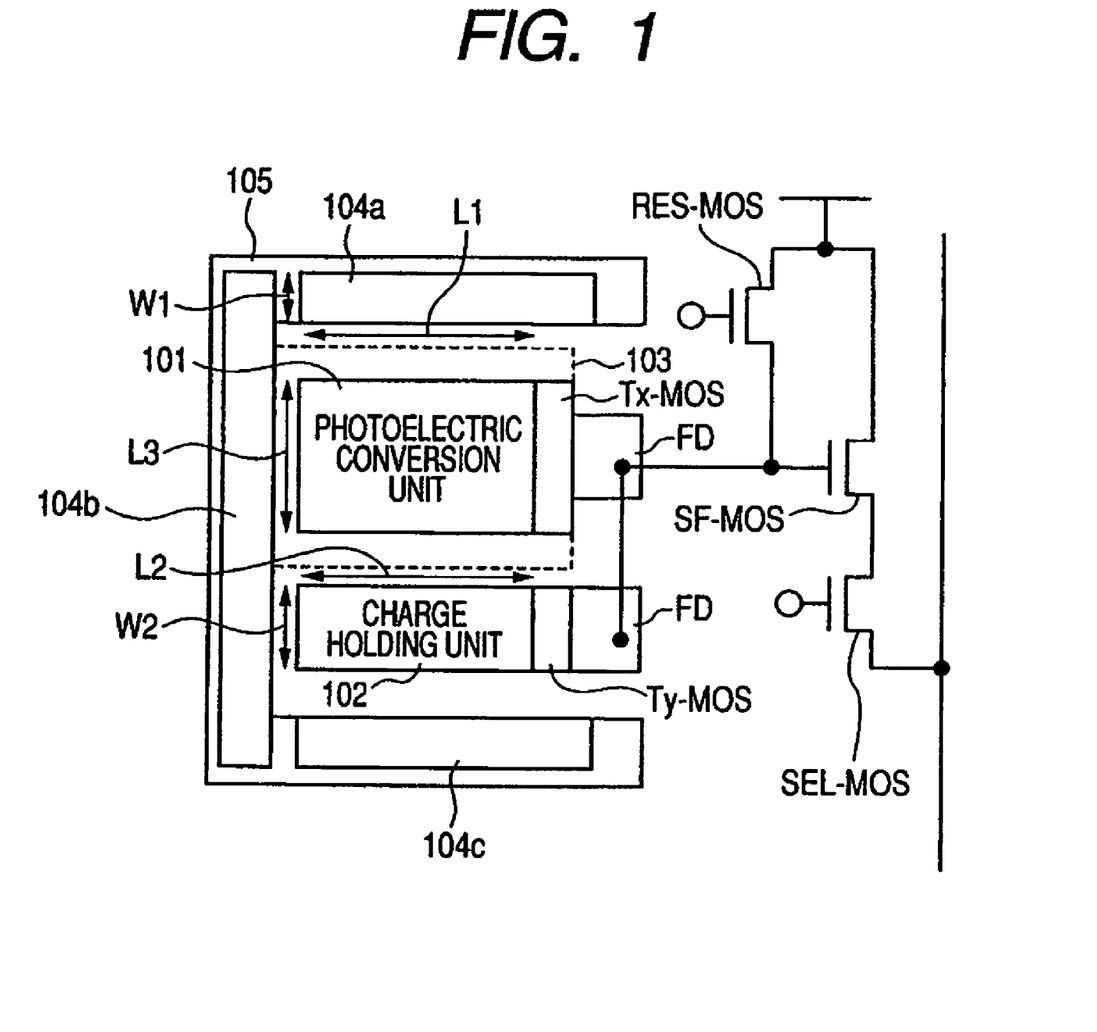
FIG. 1 is a view showing an exemplary structure of a solid-state image pickup device according to a first embodiment of the present invention.

FIG. 1 is a view showing an exemplary structure of a solid-state image pickup device according to a first embodiment of the present invention. The solid-state image pickup device has a plurality of pixels arranged in a two-dimensional array. Hereinafter an n-channel MOS field-effect transistor is simply referred to as a MOS transistor. A pixel includes transfer MOS transistors Tx-MOS and Ty-MOS, a reset MOS transistor RES-MOS, a source follower MOS transistor SF-MOS and a select MOS transistor SEL-MOS. The source and drain of the transfer MOS transistor Tx-MOS correspond to a photodiode PD 101 functioning as a photoelectric conversion unit and a floating diffusion FD. The source and drain of the transfer MOS transistor Ty-MOS correspond to a charge holding unit 102 and an FD.

The photoelectric conversion unit 101 and charge holding unit 102 have a structure having a reverse conducting-type impurity region formed on the surface of an impurity region accumulating and holding charge. The photoelectric conversion unit 101 is opened and the charge holding unit 102 is light-shielded. The photoelectric conversion unit 101 has the circumference thereof enclosed by an element separation portion 103. The element separation portion 103 has a higher potential barrier than that of the photoelectric conversion unit 101 against the charge accumulated in the photoelectric conversion unit 101, so the photoelectric conversion unit 101 can accumulate a predetermined amount of charge. Referring to FIG. 1, the photoelectric conversion unit 101 has a drain portion 104a provided upward thereof via the element separation portion 103, a drain portion 104b provided to the left thereof, and the charge holding unit 102 provided downward thereof. The charge holding unit 102 has the drain portion 104b provided to the left thereof and a drain portion 104c provided downward thereof. Hereinafter the drain portions 104a, 104b and 104c are separately or collectively referred to as a drain portion 104. The drain portion 104 is connected to a fixed power source potential VDD. The drain portion 104a is the drain of the reset MOS transistor RES-MOS, for example. The circumference of the drain portion 104 is enclosed by an element separation portion 105. The element separation portion 105 prevents charge from leaking from the self pixel to a neighboring pixel. The photoelectric conversion unit 101 has a rectangular planar shape and has the drain portions 104a and 104b disposed opposite the two sides of the rectangular shape, and the charge holding unit 102 is disposed opposite another side.

In the broad sense, the element separation portion 105 includes the drain portion 104. By virtue of the drain portion, the leak to a neighboring pixel can be further suppressed. The drain portion can double as an impurity diffusion region such as the drain and source of a MOS transistor used as an amplifying unit or the like. This indicates that the structure of the present invention, i.e., the use of a lateral overflow mechanism is suitable for an amplification type solid-state image pickup device having MOS transistors within a pixel.

The photoelectric conversion unit 101 is a photodiode generating and accumulating charge by means of photoelectric conversion, for example. The floating diffusion FD is a diffusing region accumulating charge and converting it to voltage. The gate of the transfer MOS transistor Tx-MOS serves to transfer charge generated by the photoelectric conversion unit 101 to the floating diffusion FD. By turning off the transfer gate, the photoelectric conversion unit 101 can generate and accumulate charge by means of photoelectric conversion. After completion of the accumulation time, by turning on the transfer gate, the charge accumulated in the photoelectric conversion unit 101 can be transferred (read out) to the floating diffusion FD.

Figure 2A:
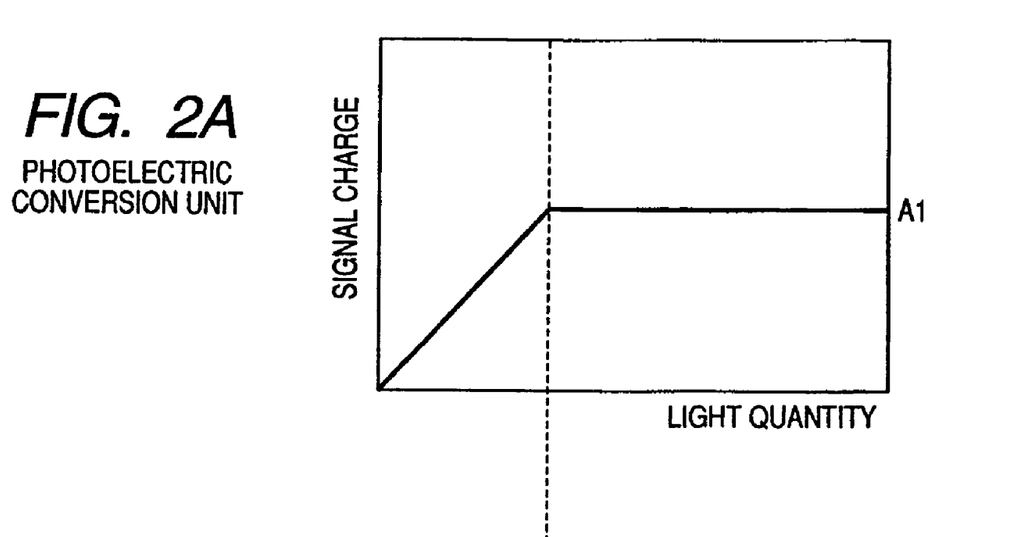
FIG. 2A is a graph showing a relationship between light quantity and signal charge of a photoelectric conversion unit.

FIG. 2A is a graph showing a relationship between light quantity and signal charge of the photoelectric conversion unit 101. In the photoelectric conversion unit 101, the accumulatable amount of signal charge A1 is fixed. Accordingly, when strong light is irradiated on the photoelectric conversion unit 101, charge spills from the photoelectric conversion unit 101 and the photoelectric conversion unit 101 saturates at a light quantity t1. A part of charge spilling from the photoelectric conversion unit 101 flows into the charge holding unit 102 and the rest of charge is drained out to the drain portion 104.

Figure 2B:
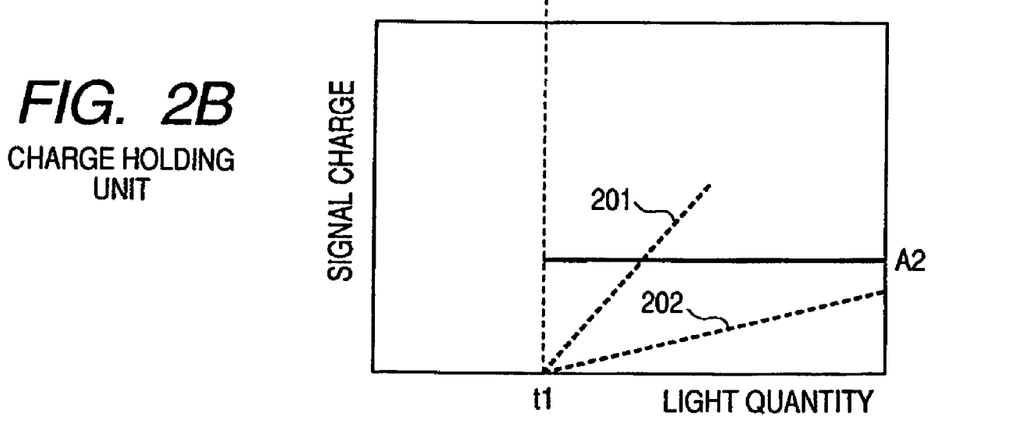
FIG. 2B is a graph showing a relationship between light quantity and signal charge of a charge holding unit.

FIG. 2B is a graph showing a relationship between light quantity and signal charge of the charge holding unit 102. In the charge holding unit 102, also, the accumulatable amount of signal charge A2 is fixed, and hence the spilling charge is drained out to the drain portion 104.

Characteristic line 201 indicates a case where the charge spilling from the photoelectric conversion unit 101 entirely flows into the charge holding unit 102. The slope of the characteristic line 201 of the charge holding unit 102 is identical to that of the characteristic line of the photoelectric conversion unit 101 of FIG. 2A. In this case, however, the charge holding unit 102 saturates at a relatively small light quantity.

Characteristic line 202 indicates a case where from among the charge spilling from the photoelectric conversion unit 101, one part flows into the charge holding unit 102 and the rest is drained out to the drain portion 104. The slope of the characteristic line 202 of the charge holding unit 102 is less steep than that of the characteristic line of the photoelectric conversion unit 101 of FIG. 2A. Accordingly, even when strong light is irradiated on the photoelectric conversion unit 101, the charge holding unit 102 hardly saturates. Dynamic range of pixel signal can thus be extended.

More specifically, if the ratio of charge spilling into the charge holding unit 102 can be reduced, dynamic range can be further extended. In addition, according to the present invention, the holding unit can have the same structure as that of the photoelectric conversion unit. Thus, even when the spilling ratio is reduced, detection with a small noise influence and a high sensitivity is possible.

When light is irradiated on the photoelectric conversion unit 101, charge is accumulated in the photoelectric conversion unit 101 until the light quantity t1 is reached, and no charge is accumulated in the charge holding unit 102. When the light quantity t1 is reached, the photoelectric conversion unit 101 saturates, charge flows from the photoelectric conversion unit 101 into the charge holding unit 102, and the charge holding unit 102 begins to accumulate charge.

The charge holding unit 102 has a lateral (horizontal type) overflow drain structure, whereby a part of charge spilling from the photoelectric conversion unit 101 flows into the charge holding unit 102. The drain portion 104 also has a horizontal type overflow drain structure, whereby another part of charge spilling from the photoelectric conversion unit 101 is drained out to the drain portion 104. More specifically, the charge holding unit 102 and drain portion 104 are disposed at the same depth from the main surface of a semiconductor substrate.

Referring to FIG. 1, length L1 represents the length of the side of the photoelectric conversion unit 101 opposite the drain portion 104a. Length L2 represents the length of the side of the photoelectric conversion unit 101 opposite the charge holding unit 102. Length L3 represents the length of the side of the photoelectric conversion unit 101 opposite the drain portion 104b. If the amount of excessive carrier spilling from the photoelectric conversion unit 101 when the photoelectric conversion unit 101 saturates, is Q0, then the amount of excessive carrier Q1 flowing into the charge holding unit 102 from the photoelectric conversion unit 101 is expressed as the following formula.

$$Q1=Q0 \times L2/(L1+L2+L3)$$

When the impurity profile between the photoelectric conversion unit 101 and charge holding unit 102 is substantially identical to that between the photoelectric conversion unit 101 and drain portion 104, the flowing-in amount per unit side is considered to be equal for each side, so the above ratio is obtained. A variation in process causes a small variation in potential barrier. However, as described above, the flowing-in amount per unit side is equal. Thus, even when there exists a variation in process, if a design is not purposely made so that a different impurity profile is obtained, the above ratio is maintained.

As the drain portion 104, an impurity region, such as a MOS transistor, connected to the power source terminal is used, so any additional area is not particularly needed. When a vertical (vertical type) overflow drain is employed, the impurity density of the lower part of the charge accumulation region must be low; thus the saturation charge A1 of the photoelectric conversion unit 101 is reduced. According to the present embodiment, a horizontal type overflow drain is employed, so the saturation charge A1 of the photoelectric conversion unit 101 is not reduced. It is important that even when dynamic range is extended by the charge holding unit 102, the saturation charge A1 of the photoelectric conversion unit 101 being the main unit can be kept at a high level.

According to the present embodiment, by virtue of the horizontal type overflow drain structure, there are provided a path for draining out to a fixed potential of the drain portion 104 the charge spilling from the photoelectric conversion unit 101, and a path for draining it out to the charge holding unit 102.

By arranging horizontal type overflow drains in parallel, it is possible to adjust the amount of charge flowing into the charge holding unit 102 by two-dimensional arrangement. For example, the adjustment can be made by means of at least one of (1) widths L1 and L3 of the photoelectric conversion unit 101 neighboring the drain portion 104, (2) length W1 of the drain portion 104, (3) width L2 of the charge holding unit 102, (4) length W2 of the charge holding unit, and so on. It is also possible to have a different impurity profile between each region to send a desired percentage of spilling-out charge to the charge holding unit 102.

The photoelectric conversion unit 101 and charge holding unit 102 have a structure having a reverse conducting-type impurity region formed on the surface of an impurity region which accumulates and holds charge. The photoelectric conversion unit 101 is opened and the charge holding unit 102 is light-shielded. The photoelectric conversion unit 101 and charge holding unit 102 have the same structure and have a reverse conducting-type impurity region formed on the surface thereof, so even when a signal of the photoelectric conversion unit 101 is added to that of the charge holding unit 102, noises hardly occur. Also, the percentage of charge spilling from the photoelectric conversion unit 101 and flowing into the charge holding unit 102 is controlled by the area and the circumference length of the photoelectric conversion unit 101, the charge holding unit 102 and the drain portion 104, so the influence from a variation in process hardly exists.

Negative charge (electron) photoelectrically converted by the photoelectric conversion unit 101 is accumulated in the first conducting-type (n-type) charge accumulation region of the photoelectric conversion unit 101. The charge holding unit 102 is a light-shielded region separated from the photoelectric conversion unit 101. There are provided a first path for draining out a part of excessive carrier to the drain portion 104 of a first conductive type in a pixel when the saturation charge of the photoelectric conversion unit 101 is exceeded, and a second path for draining out another part of excessive carrier to the charge holding unit 102. The photoelectric conversion unit 101 is connected to a source follower MOS transistor SF-MOS constituting a source follower amplifier via a first transfer unit (the gate of MOS transistor Tx-MOS). The charge holding unit 102 is connected to a source follower MOS transistor SF-MOS constituting a source follower amplifier via a second transfer unit (the gate of MOS transistor Ty-MOS). The source follower amplifiers amplify the signal charge of the photoelectric conversion unit 101 and charge holding unit 102.

Figure 3:
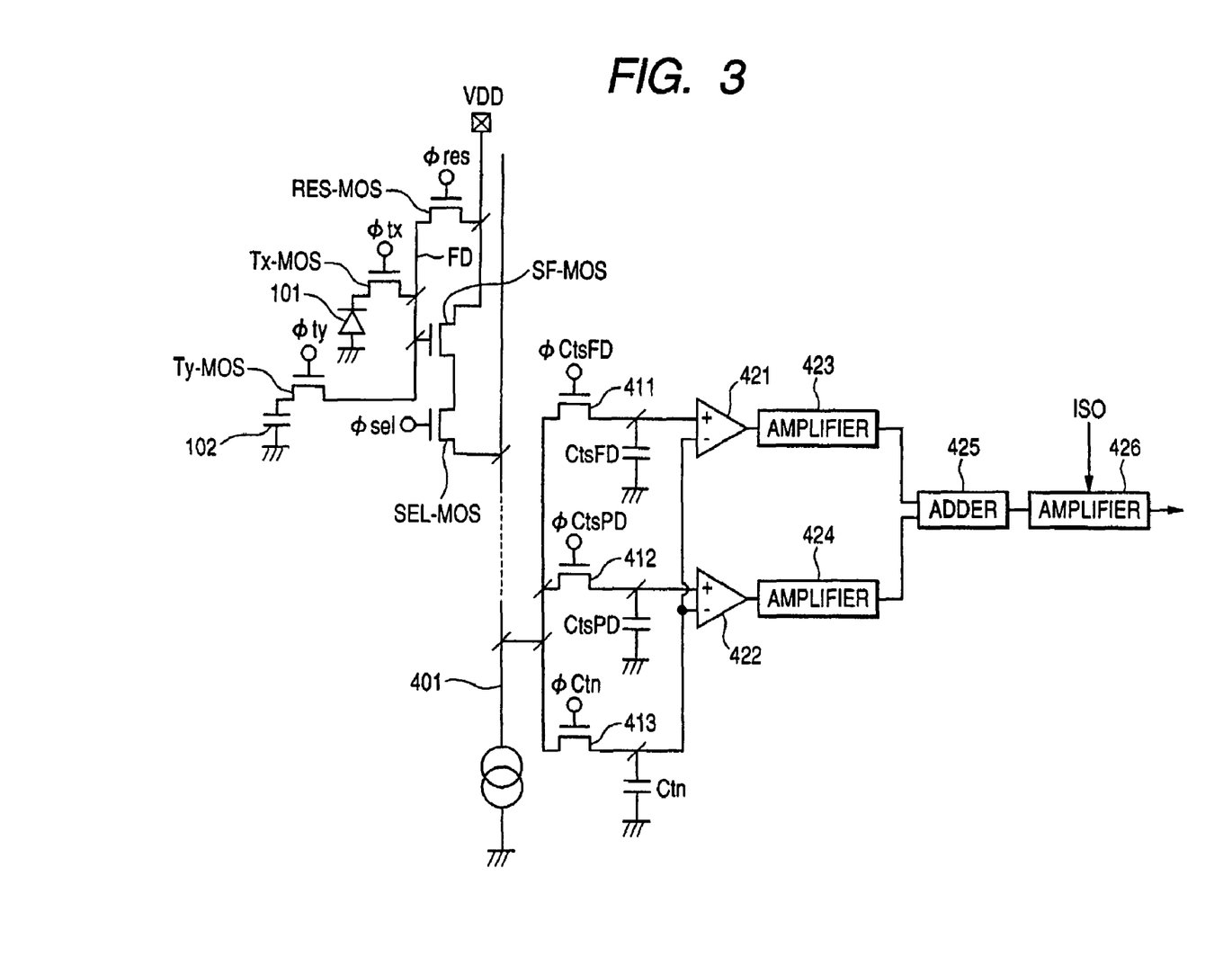
FIG. 3 is an equivalent circuit diagram of the solid-state image pickup device of FIG. 1.
Figure 4:
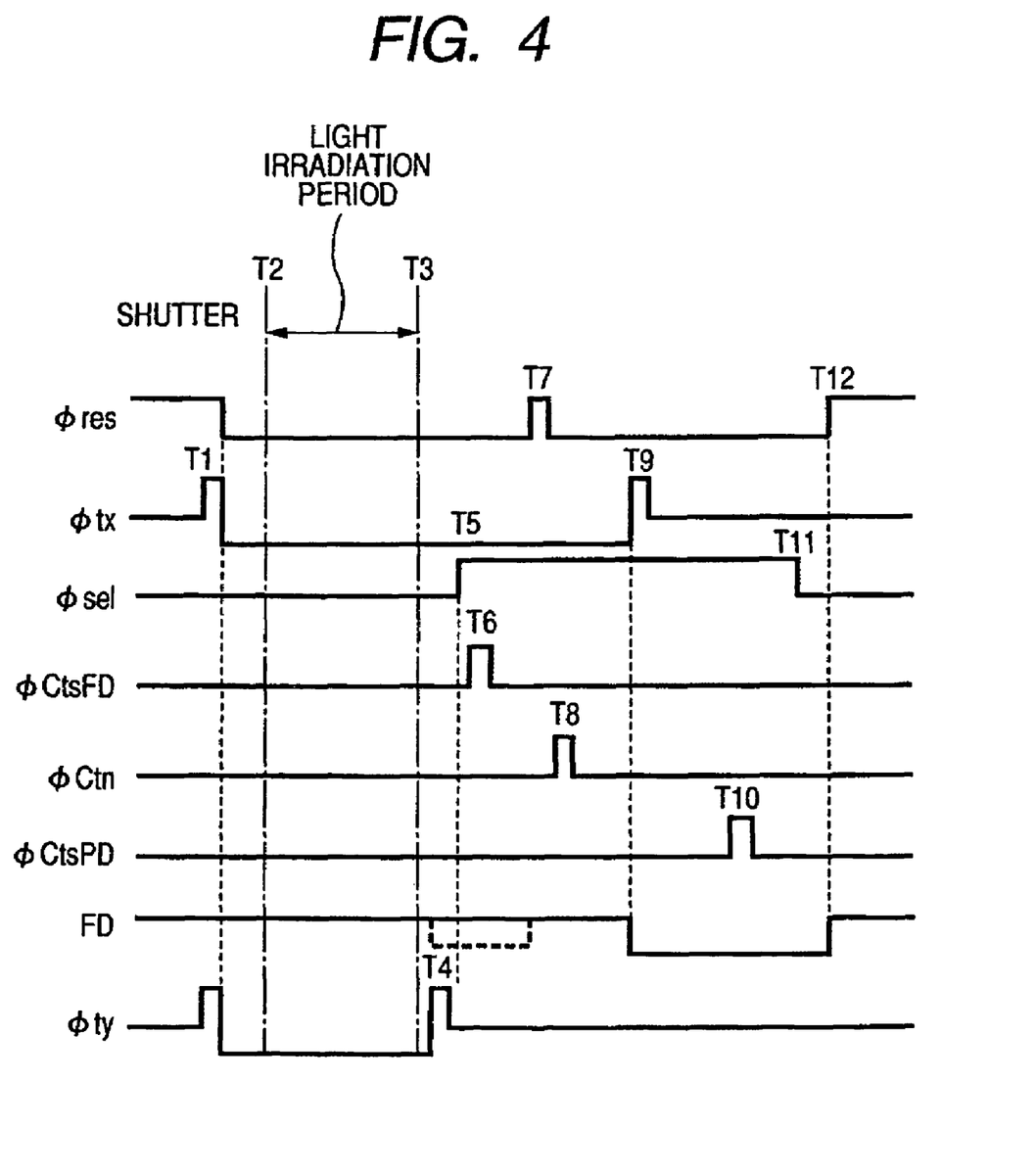
FIG. 4 is a timing chart showing an example of operation of the circuit of FIG. 3.

FIG. 3 is an equivalent circuit diagram of the solid-state image pickup device of FIG. 1. FIG. 4 is a timing chart showing an example of operation of the circuit of FIG. 3. Potential $\phi$res denotes a gate potential of reset MOS transistor RES-MOS, potential $\phi$tx denotes a gate potential of transfer MOS transistor Tx-MOS, potential $\phi$ty denotes a gate potential of transfer MOS transistor Ty-MOS, potential $\phi$sel denotes a gate potential of select MOS transistor SEL-MOS, potential $\phi$CtsFD denotes a gate potential of transfer MOS transistor 411, potential $\phi$ctn denotes a gate potential of transfer MOS transistor 413, and potential $\phi$CtsPD denotes a gate potential of transfer MOS transistor 412.

Before timing T1, potential $\phi$res is positive (ON) and potentials $\phi$tx, $\phi$ty, $\phi$sel, $\phi$CtsFD, $\phi$Ctn and $\phi$CtsPD are 0 V (OFF). When the reset MOS transistor RES-MOS is turned on, the power source potential VDD is supplied to a floating diffusion FD.

Subsequently, at timing T1, positive pulse are applied as potentials φtx and φty. The transistors Tx-MOS and Ty-MOS are turned on to apply the power source potential VDD to the floating diffusion FD, the photoelectric conversion unit 101 and the charge holding unit 102 to reset them. After the resetting, potential φres is lowered to 0 V, and the reset MOS transistor RES-MOS is turned off. Then potentials φtx and φty are lowered to, for example, −1.3 V to change the photoelectric conversion unit 101, the charge holding unit 102 and the floating diffusion FD to a floating state. At this time, an external mechanical shutter is still not opened, and the accumulation of photoinduced charge has not started yet in the photoelectric conversion unit 101.

Subsequently, at timing T2, a mechanical shutter 53 (refer to FIG. 7) is opened, and light is irradiated on the photoelectric conversion unit 101, and the photoelectric conversion unit 101 begins to generate and accumulate photoinduced charge. When weak light is irradiated on the photoelectric conversion unit 101, the photoelectric conversion unit 101 does not saturate and charge does not flow from the photoelectric conversion unit 101 into the charge holding unit 102. In contrast, when strong light is irradiated on the photoelectric conversion unit 101, the photoelectric conversion unit 101 saturates and a part of charge flows from the photoelectric conversion unit 101 into the charge holding unit 102.

Subsequently, at timing T3, the shutter 53 is closed, and the photoelectric conversion unit 101 is changed to a light-shielded state, and the generation of photoinduced charge in the photoelectric conversion unit 101 is terminated.

Subsequently, at timing T4, a positive pulse is applied as potential φty. The transfer MOS transistor Ty-MOS is turned on to read out the negative charge accumulated in the charge holding unit 102 into the floating diffusion FD. A solid line drawn in the potential of the floating diffusion FD indicates a case where weak light is irradiated and no charge spills from the photoelectric conversion unit 101 to the charge holding unit 102. A broken line drawn in the potential of the floating diffusion FD indicates a case where strong light is irradiated and charge spills from the photoelectric conversion unit 101 to the charge holding unit 102. When negative charge is read out from the charge holding unit 102 to the floating diffusion FD, the potential of the floating diffusion FD is lowered.

Subsequently, at timing T5, potential φsel is changed from 0 V to a positive value. The select MOS transistor SEL-MOS is turned on to change a signal output line 401 to an active state. The source follower MOS transistor SF-MOS, constituting a source follower amplifier, outputs an output voltage to the signal output line 401 according to the potential of the floating diffusion FD.

Subsequently, at timing T6, a positive pulse is applied as potential φCtsFD. The transistor 411 is turned on to cause a potential of the signal output line 401 dependent on the potential of the floating diffusion FD to be accumulated in capacitance CtsFD. In a pixel where the photoelectric conversion unit 101 is not in a saturation state, charge does not spill out to the charge holding unit 102, so an output dependent on the reset voltage VDD of the floating diffusion FD is accumulated in capacitance CtsFD. When strong light is irradiated on the photoelectric conversion unit 101 and the photoelectric conversion unit 101 saturates, a lower output than the reset voltage VDD of the floating diffusion FD is accumulated in capacitance CtsFD.

Subsequently, at timing T7, a positive pulse is applied as potential φres. The reset MOS transistor RES-MOS is turned on to reset again the floating diffusion FD to the reset voltage VDD.

Subsequently, at timing T8, a positive pulse is applied as potential φCtn. The MOS transistor 413 is turned on to cause an offset noise voltage of the signal output line 401 obtained when the floating diffusion FD is reset, to be accumulated in capacitance Ctn.

Subsequently, at timing T9, a positive pulse is applied as potential φtx. The transfer MOS transistor Tx-MOS is turned on to read out the charge accumulated in the photoelectric conversion unit 101 into the floating diffusion FD.

Subsequently, at timing T10, a positive pulse is applied as potential φCtsPD. The MOS transistor 412 is turned on to cause a voltage of the signal output line 401 dependent on the charge read out from the photoelectric conversion unit 101 to the floating diffusion FD, to be accumulated in capacitance CtsFD.

Subsequently, at timing T11, potential φsel is changed to 0 V. The select MOS transistor SEL-MOS is turned off to change the signal output line 401 to a non-active state.

Subsequently, at timing T12, potential φres is turned positive. The reset MOS transistor RES-MOS is turned on to clamp the potential of the floating diffusion FD to the power source potential VDD.

In the processings describe above, a voltage corresponding to offset noise is accumulated in capacitance Ctn; a voltage corresponding to charge spilling from the photoelectric conversion unit 101 to the charge holding unit 102 is accumulated in capacitance CtsFD; and a voltage corresponding to the accumulated charge in the photoelectric conversion unit 101 is accumulated in capacitance CtsPD.

Figure 9:
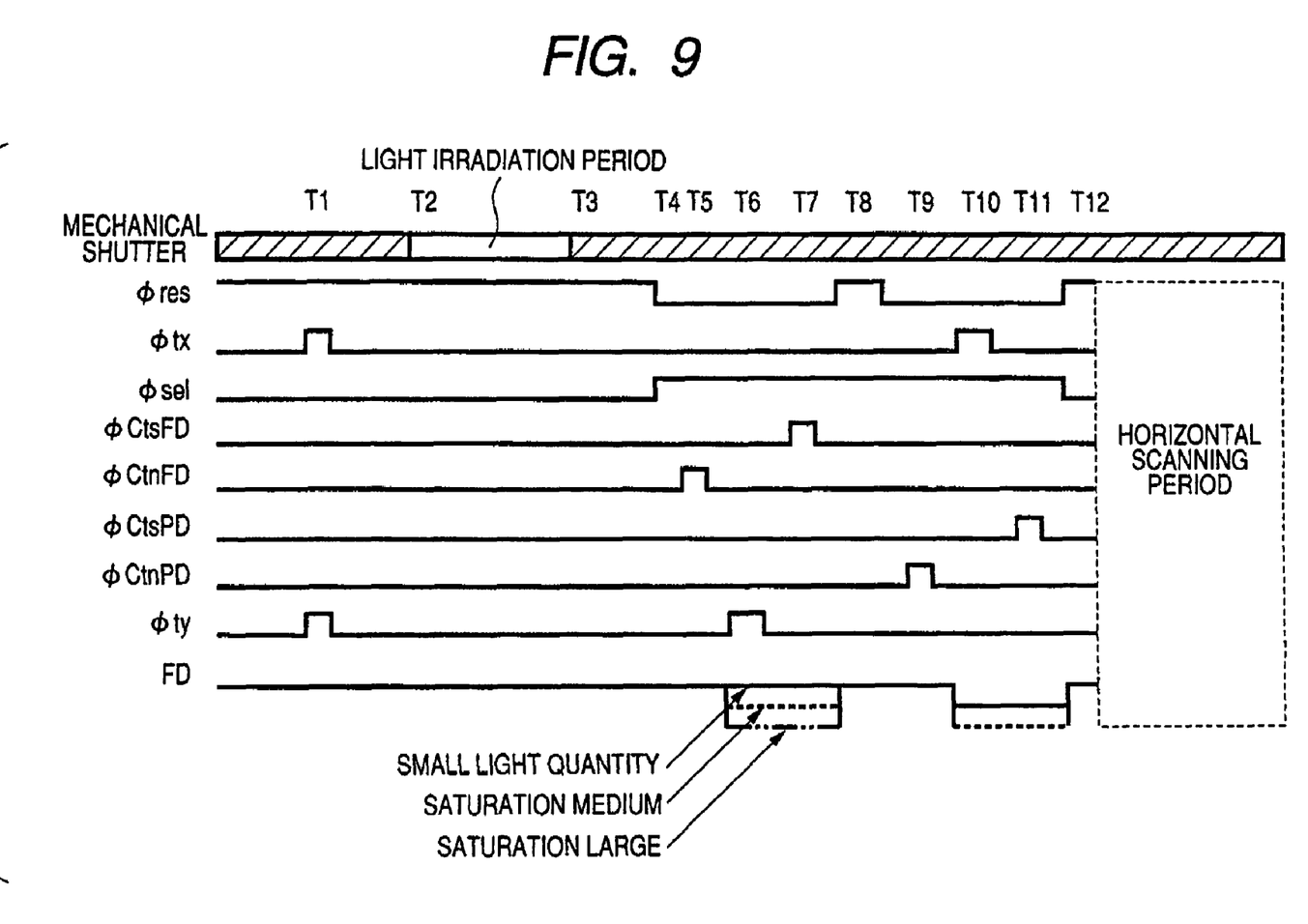
FIG. 9 is a timing chart showing another example of operation of the solid-state image pickup device.

FIG. 9 shows another example. FIG. 9 is a timing chart showing an example of operation in a structure in which, as capacitance Ctn accumulating a voltage corresponding to offset noise shown in FIG. 3, there are further provided two capacitances, that is, capacitance CtnPD for the photoelectric conversion unit 101 and capacitance CtnFD for the charge holding unit 102. Similarly, there are also two MOS transistors 413; one of them is controlled by gate potential φCtnPD and the other by gate potential φCtnFD.

Timing T1 is a reset period of the photoelectric conversion unit 101 and charge holding unit 102. Timing T2 to T3 is a light irradiation period. Timing T4 is a read initiation (reset release) period. Timing T5 is a noise voltage write period for reading from the charge holding unit 102. Timing T6 is a period for transferring a signal from the charge holding unit 102 to the floating diffusion FD. Timing T7 is a signal voltage write period for reading from the charge holding unit 102. Timing T8 is a period for resetting the floating diffusion FD. Timing T9 is a noise voltage write period for reading from the photoelectric conversion unit 101. Timing T10 is a period for transferring a signal from the photoelectric conversion unit 101 to the floating diffusion FD. Timing T11 is a signal voltage write period for reading from the photoelectric conversion unit 101. Timing T12 is a read completion (reset ON) period. More detailed descriptions will be given below.

Firstly, at timing T1, in order to reset the photoelectric conversion unit 101 and charge holding unit 102, potential φres is turned positive and positive pulses are applied as potentials φtx and φty.

Subsequently, at timing T2 to T3, a mechanical shutter 53 is opened to expose the photoelectric conversion unit 101. At timing T4, potential φres is changed to 0 V to initiate the read.

Firstly, at timing T5, a positive pulse is applied as potential φCtnFD to cause N signal (offset noise) of the charge holding unit 102 to be accumulated. At timing T6, a positive pulse is applied as potential φty to transfer signal charge accumulated in the charge holding unit 102. At timing T7, a positive pulse is applied as potential φCtsFD to cause S signal (proper signal) to be accumulated in capacitance CtsFD.

Subsequently, at timing T8, in order to reset the floating diffusion FD, potential φres is turned positive. At timing T9 to T11, the charge accumulated in the photoelectric conversion unit 101 is read out. This is a sequence similar to that of reading out N signal and S signal from the charge holding unit 102 at timing T5 to T7 and implemented by applying a pulse to potentials φCtsFD, φCtnPD and φtx. The potential of floating diffusion FD shown in FIG. 9 represents the amount of charge spilling into the floating diffusion FD.

Referring to FIG. 3, a differential amplifier 421 outputs a voltage obtained by subtracting the noise voltage of capacitance Ctn from the signal voltage of capacitance CtsFD. A differential amplifier 422 outputs a voltage obtained by subtracting the noise voltage of capacitance Ctn from the signal voltage of capacitance CtsPD. An amplifier 423 amplifies the output of the differential amplifier 421. An amplifier 424 amplifies the output of the differential amplifier 422.

The gain of the amplifiers 423 and 424 is determined by the ratio between the amount of charge flowing into the charge holding unit 102 from among the charge spilling from the photoelectric conversion unit 101 and the amount drained out to the drain portion 104. For example, a description will be given of an example in which ⅓ of the charge spilling from the photoelectric conversion unit 101 flows into the charge holding unit 102 and ⅔ of the charge is drained out to the drain portion 104. In this case, the input signal of the amplifier 423 is tripled to be outputted, and the input signal of the amplifier 424 is directly outputted. More specifically, this means that three times the amount of charge spilling out to the charge holding unit 102 is equal to the amount of charge spilling from the photoelectric conversion unit 101.

When an amplifier circuit within a pixel is shared to read out a signal from the charge holding unit 102 and a signal from the photoelectric conversion unit 101, i.e., the read paths are similar to each other, then a small difference of sensitivity or an offset difference caused by a variation in path can be suppressed. Consequently, it is possible to perform the amplification at a rear-stage amplifier. Particularly, in order to extend dynamic range, this amplification at a rear-stage amplifier must be large; by making the paths similar to each other, the amplification becomes possible.

An adder 425 adds the outputs of the amplifiers 423 and 424 and outputs the resultant pixel signal. The pixel signal is generated based on the charge accumulated in the photoelectric conversion unit 101 and that spilling into the charge holding unit 102. Thus, compared to a case where only the charge accumulated in the photoelectric conversion unit 101 is used, the dynamic range of pixel signal can be extended.

An amplifier 426 amplifies the output of the adder 425 according to ISO sensitivity and outputs the resultant signal. When the value of ISO sensitivity is small, the gain is small; when the value of ISO sensitivity is large, the gain is large.

The above elements constitute the pixel signal generation unit. The pixel signal generation unit generates pixel signal according to the charge accumulated in the photoelectric conversion unit 101 and that accumulated in the charge holding unit 102. According to the present embodiment, the ratio of the charge spilling from the photoelectric conversion unit 101 and flowing into the charge holding unit 102 can be controlled with high accuracy, thus extending dynamic range and at the same time improving image quality. Also, both the structure for the overflow from the photoelectric conversion unit 101 to the charge holding unit 102 and that for the overflow from the photoelectric conversion unit 101 to the drain portion 104 are of horizontal type overflow drain. Accordingly, the ratio of the amount of spilling charge between the two structures can easily be controlled.

Second Embodiment

Figure 5:
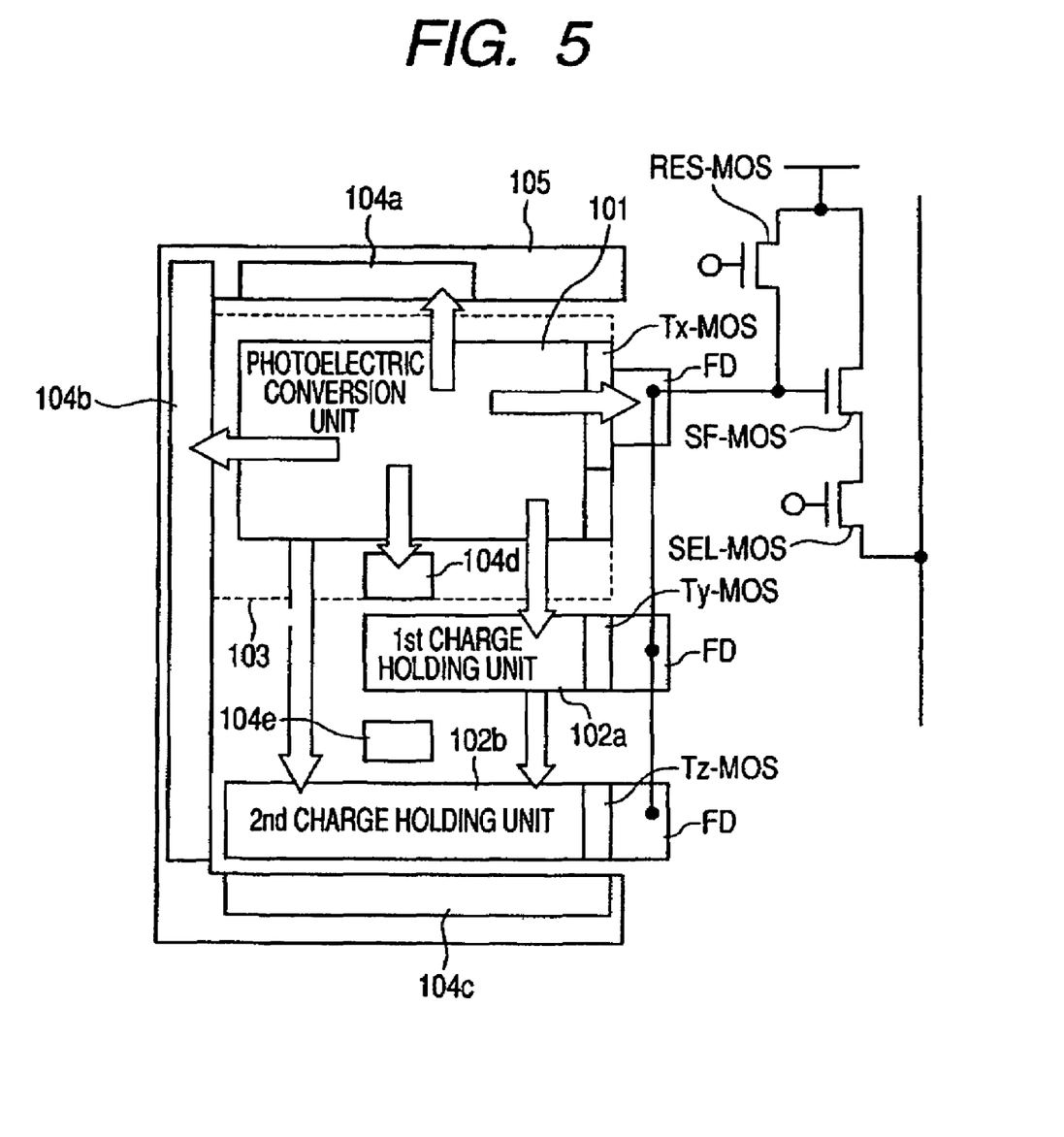
FIG. 5 is a view showing an exemplary structure of a solid-state image pickup device according to a second embodiment of the present invention.

FIG. 5 is a view showing an exemplary structure of a solid-state image pickup device according to a second embodiment of the present invention. The difference between FIG. 5 and FIG. 1 will now be described. According to the present embodiment, instead of the charge holding unit 102 of FIG. 1, a first charge holding unit 102a and a second charge holding unit 102b are provided. Hereinafter, the charge holding units 102a and 102b are separately or collectively referred as a charge holding unit 102.

The source and drain of a transfer MOS transistor Ty-MOS correspond to the first charge holding unit 102a and floating diffusion FD. By controlling the gate of the MOS transistor Ty-MOS, the charge accumulated in the first charge holding unit 102a can be read out from the floating diffusion FD.

The source and drain of a transfer MOS transistor Tz-MOS correspond to the second charge holding unit 102b and floating diffusion FD. By controlling the gate of the MOS transistor Tz-MOS, the charge accumulated in the second charge holding unit 102b can be read out from the floating diffusion FD.

A drain portion 104d, disposed between the photoelectric conversion unit 101 and the first charge holding unit 102a, drains out a part of the charge spilling from the photoelectric conversion unit 101. A drain portion 104e, disposed between the first charge holding unit 102a and second charge holding unit 102b, drains out a part of the charge spilling from the first charge holding unit 102a. Hereinafter, the drain portions 104a to 104e are separately or collectively referred as a drain portion 104.

A part of the charge spilling from the photoelectric conversion unit 101 flows into the first charge holding unit 102a, another part thereof flows into the second charge holding unit 102b, and the rest thereof is drained out to the drain portion 104. When the first charge holding unit 102a saturates, a part of the charge spilling from the first charge holding unit 102a flows into the second charge holding unit 102b, and the rest thereof is drained out to the drain portion 104.

A direct flow path from the photoelectric conversion unit 101 to the second charge holding unit 102b is not always needed. For example, it is possible to cause ½ the amount of charge spilling from the photoelectric conversion unit 101 to flow into the first charge holding unit 102a, and further to cause ½ the amount of charge spilling from the first charge holding unit 102a to flow into the second charge holding unit 102b.

According to the present embodiment, the second charge holding unit 102b can be two-dimensionally disposed. Thus it is further possible to capture the charge spilling from the first charge holding unit 102a into the second charge holding unit 102b, whereby dynamic range can be further extended.

Figure 6A:
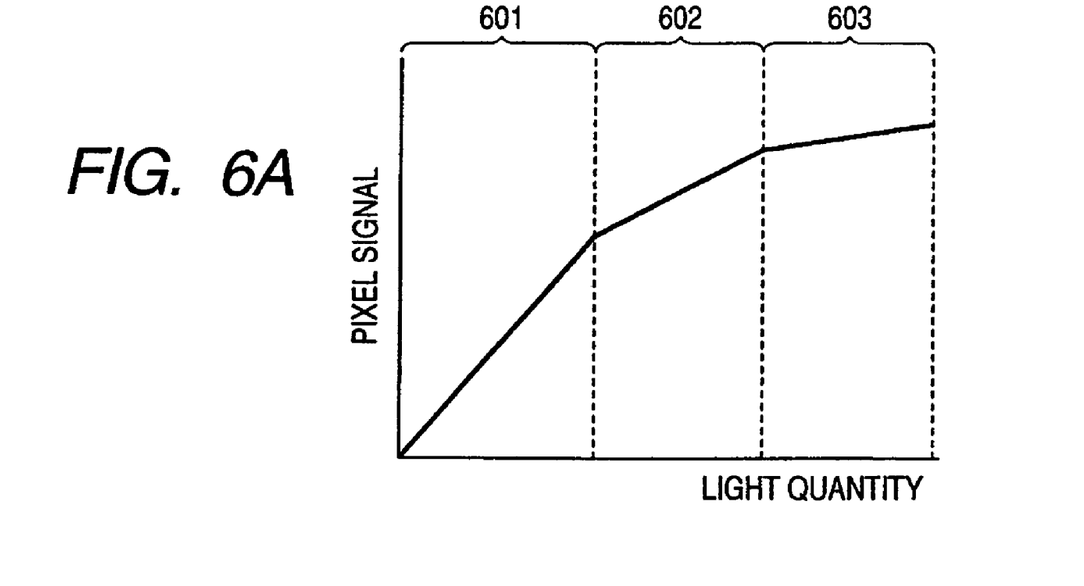
FIG. 6A is a graph showing a relationship between light quantity and signal charge of the solid-state image pickup device according to the second embodiment.

FIG. 6A is a graph showing a relationship between light quantity and signal charge of a solid-state image pickup device according to the present embodiment. Signal charge represents the total amount of charge accumulated in the photoelectric conversion unit 101 and the charge holding units 102a and 102b. As light quantity increases, signal charge moves from region 601 to region 603. Region 601 indicates the signal charge accumulated in the photoelectric conversion unit 101 before the photoelectric conversion unit 101 saturates. Region 602 indicates a region where a part of the charge accumulated in the photoelectric conversion unit 101 flows into the first charge holding unit 102a after the photoelectric conversion unit 101 saturates. Region 603 indicates a region where a part of the charge accumulated in the first charge holding unit 102a flows into the charge holding unit 102b after the first charge holding unit 102a saturates. The slope of characteristic line becomes gradually gentle from region 601 to region 603. For human visual sensitivity characteristics, when light quantity is large (bright), the change of light quantity is relatively difficult to recognize. Accordingly, signal charge as it is, can be considered as pixel signal. More specifically, the amplifiers 423 and 424 of FIG. 3 are not always needed.

Figure 6B:
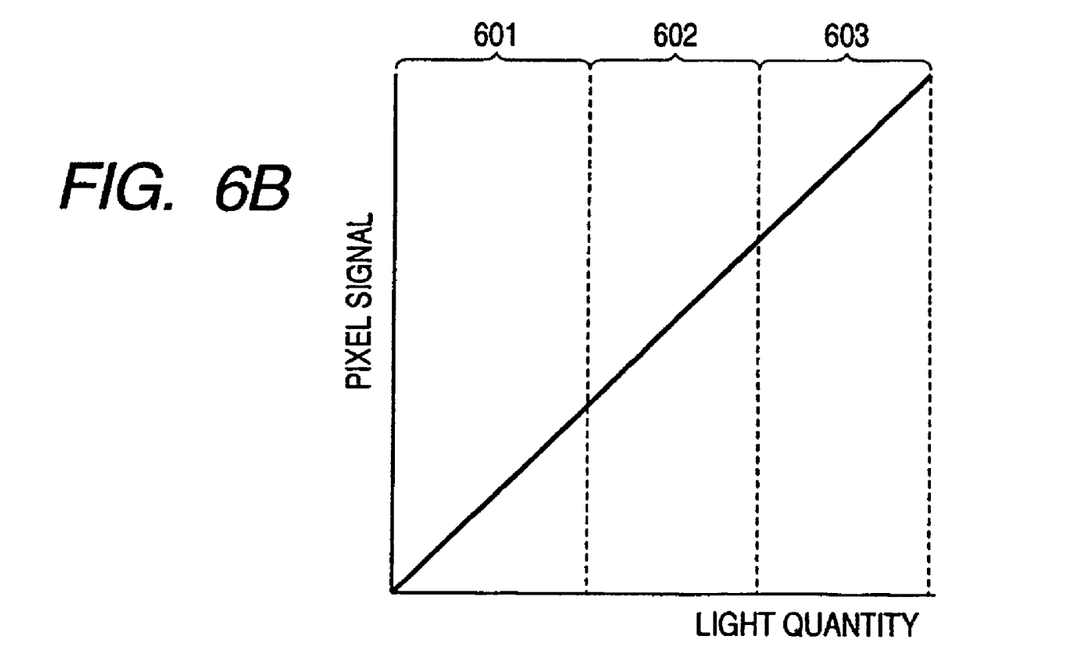
FIG. 6B is a graph showing a relationship between light quantity and pixel signal of the solid-state image pickup device according to the second embodiment.

FIG. 6B is a graph showing a relationship between light quantity and pixel signal of the solid-state image pickup device according to the present embodiment. Pixel signal is obtained by applying gain correction to the signal charge in each region 601 to 603 of FIG. 6 by use of the amplifiers 423 and 424 and the like. In the entire region 601 to 603, pixel signal can hold a linear characteristic relative to light quantity.

According to the present embodiment, the first charge holding unit 102a and the second charge holding unit 102b can easily be stepwise disposed, whereby the linear characteristic of FIG. 6 (A) can have continuity.

By controlling the low-level potential of the gate of transfer MOS transistor Tx-MOS, it is also possible to cause a part of charge to flow from the photoelectric conversion unit 101 into the floating diffusion FD, thereby controlling the ratio of the charge flowing into the first charge holding unit 102a. However, while an overflow control of no less than 50% of excessive carrier is possible, it is difficult to control a lesser amount due to a variation. Thus, by simultaneously employing the present embodiment, a higher-accuracy control becomes possible.

When the low-level potential of the gate of transfer MOS transistor Tx-MOS is controlled, if the amount of charge spilling into the first charge holding unit 102a is suppressed, i.e., if the amount of charge spilling from the photoelectric conversion unit 101 into the floating diffusion FD is increased, a problem of dark current occurring in the transfer MOS transistor Tx-MOS arises. Thus it is difficult to significantly extend dynamic range.

The charge accumulated in the photoelectric conversion unit 101 is more important than that accumulated in the charge holding units 102a and 102b. Accordingly, it is preferable that the ratio of the amount of charge flowing into the second charge holding unit 102b is controlled by sufficiently turning off the transfer gate (the gate of transistor Tx-MOS) of the photoelectric conversion unit 101 and controlling the low-level potential of the transfer gate (the gate of transistor Ty-MOS) of the first charge holding unit 102a.

In the first and second embodiments, there is described an example where pixel signal is generated by amplifying and correcting signal charge by use of the amplifiers 423 and 424 according to the ratio of charge flowing into the charge holding unit. However, the voltage amplification may also be performed by adjusting the capacitance value (size) or the like of capacitances CtsFD and CtsPD without using the amplifiers 423 and 424.

Third Embodiment

Figure 7:
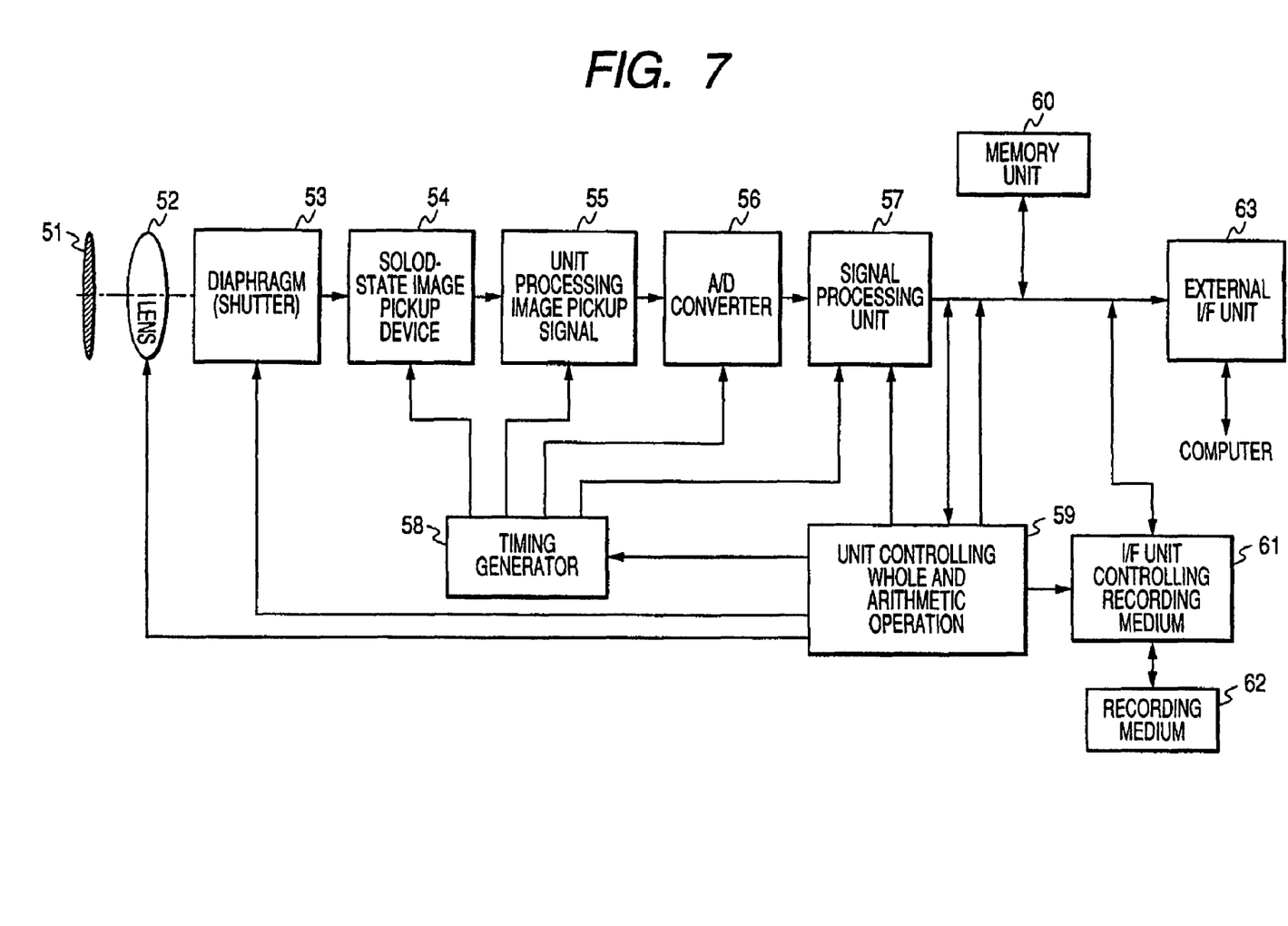
FIG. 7 is a block diagram showing an exemplary structure of a still video camera according to a third embodiment of the present invention.

FIG. 7 is a block diagram showing an exemplary structure of a still video camera according to a third embodiment of the present invention. An example where the solid-state image pickup device according to the first and second embodiments is applied to a still video camera will be described in detail with reference to FIG. 7. A solid-state image pickup device 54 and a unit processing image pickup signal 55 correspond to the above solid state image pickup device.

Referring to FIG. 7, reference numeral 51 denotes a barrier doubling as a protect of lens and a main switch, 52 denotes a lens focusing an optical image of a subject on the solid-state image pickup device 54, 53 denotes an aperture (and a shutter) adjusting the amount of light passing through the lens 52, 54 denotes a solid-state image pickup device capturing a subject focused through the lens 52 as an image signal, 55 denotes a unit processing image pickup signal applying an analog signal processing to an image pickup signal (image signal) outputted from the solid-state image pickup device 54, 56 denotes an A/D converter converting from analog to digital form an image signal outputted from the unit processing image pickup signal 55, 57 denotes a signal processing unit performing various corrections and data compression on image data outputted from the A/D converter 56, 58 denotes a timing generator outputting various timing signals to the solid-state image pickup device 54, the unit processing image pickup signal 55, the A/D converter 56 and the signal processing unit 57, 59 denotes a unit controlling whole and arithmetic operation which controls various operations and the whole still video camera, 60 denotes a memory unit temporarily storing image data, 61 denotes an I/F unit for recording and writing data onto/from a recording medium 62, 62 denotes a detachable recording medium, such as a semiconductor memory, for recording and reading image data, and 63 denotes an external I/F unit communicating with an external computer or the like.

The operation of the still video camera according to the above described configuration when videography is taken will now be described. When the barrier 51 is opened, the main power supply is turned on and then the power supply of the control system is turned on and then the power supply of the image pickup system circuits, such as an A/D converter 56, is turned on. Subsequently, in order to control the amount of exposure, the unit controlling whole and arithmetic operation 59 opens the aperture 53, and a signal outputted from the solid-state image pickup device 54 passes through the unit processing image pickup signal 55 and is converted by the A/D converter 56 and then supplied to the signal processing unit 57. Based on the resultant data, an exposure calculation is made by the unit controlling whole and arithmetic operation 59. Brightness is determined based on the photometry result. According to the determination result, the unit controlling whole and arithmetic operation 59 controls the aperture 53.

Subsequently, based on the signal outputted from the solid-state image pickup device 54, the unit controlling whole and arithmetic operation 59 extracts a high-frequency component and performs a calculation of the distance up to the subject. Then the lens is driven to determine whether or not the lens is in focus. If not, the lens is driven again to determine the distance. After it is confirmed that the lens is in focus, the shutter 53 is opened to initiate the actual exposure. When the exposure is completed, the signal outputted from the solid-state image pickup device 54 passes through the unit processing image pickup signal 55, is A/D converted by the A/D converter 56, passes through the signal processing unit 57, and is written into the memory unit 60 by the unit controlling whole and arithmetic operation 59. Then, under the control of the unit controlling whole and arithmetic operation 59, the data stored in the memory unit 60 is recorded onto the detachable recording medium 62, such as a semiconductor memory, via the I/F unit controlling recording medium 61. Alternatively, the data may be directly supplied to a computer or the like via the external I/F unit 63 to be subjected to an image processing.

The timing generator 58 controls the signals of FIG. 4 including φres, φtx, φty, φsel, φCtsFD, φCtn and φCtsPD.

Fourth Embodiment

Figure 8:
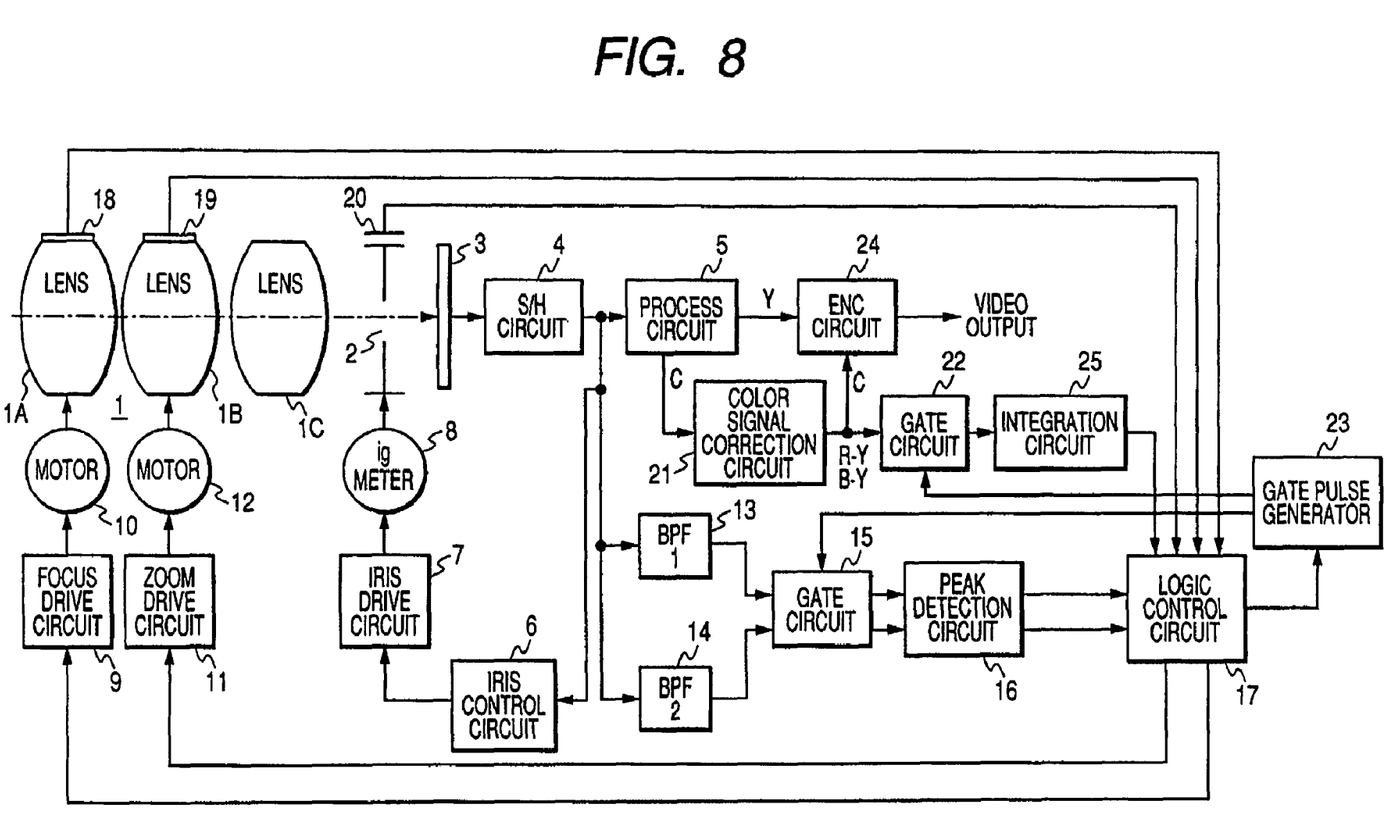
FIG. 8 is a block diagram showing an exemplary structure of a video camera according to a fourth embodiment of the present invention.

FIG. 8 is a block diagram showing an exemplary structure of a video camera according to a fourth embodiment of the present invention. An embodiment where the solid-state image pickup device according to the first and second embodiments is applied to a video camera will be described in detail with reference to FIG. 8.

Reference numeral 1 denotes a photographing lens comprising a focus lens 1A adjusting the focus, a zoom lens 1B performing a zoom operation and a lens 1C focusing an optical image, 2 denotes an aperture and a shutter, 3 denotes a solid-state image pickup device photoelectrically converting a subject image focused on the image pickup surface into an electrical image pickup signal, 4 denotes a S/H circuit sampling and holding an image pickup signal outputted from solid-state image pickup device 3 and further amplifying the level. The S/H circuit 4 outputs a video signal.

Reference numeral 5 denotes a process circuit applying predetermined processings, including γ correction, color separation and blanking, to a video signal outputted from the S/H circuit 4. The process circuit outputs a luminance signal Y and a chrominance signal C. A chrominance signal C outputted from the process circuit 5 is subjected to white balance and color balance correction by a color signal correction circuit 21 and outputted as chrominance difference signals R-Y and B-Y.

The luminance signal Y outputted from the process circuit 5 and the chrominance difference signals R-Y and B-Y outputted from the color signal correction circuit 21 are subjected to modulation by an encoder circuit (ENC circuit) 24 and outputted as a standard television signal. Then the signal is supplied to a video recorder (not shown) or an electric viewfinder such as a monitor electric view finder (EVF).

Reference numeral 6 denotes an IRIS control circuit controlling an IRIS drive circuit 7 based on the video signal supplied from the S/H circuit 4; an ig meter 8 is automatically controlled to control the amount of opening of the aperture 2 so that the level of video signal has a predetermined value (a fixed value).

Reference numerals 13 and 14 denote bandpass filters (BPF) having a different bandpass width from each other and extracting high-frequency components needed to perform focus detection from the video signal outputted from the S/H circuit 4. The signals outputted from the first bandpass filter 13 (BPF1) and the second bandpass filter 14 (BPF2) are each gated by a gate circuit 15 and a focus gate frame signal and then the peak value thereof is detected by a peak detection circuit 16 and held. The resultant signal is supplied to a logic control circuit 17. This signal is referred to as a focus voltage. Focusing is performed by this focus voltage.

Reference numeral 18 denotes a focus encoder detecting a movement position of the focus lens 1A, 19 denotes a zoom encoder detecting a focal distance of the zoom lens 1B, and 20 denotes an IRIS encoder detecting the amount of opening of the aperture 2. The detection values from these encoders are supplied to the logic control circuit 17 for system control.

Based on a video signal corresponding to a set focus detection range, the logic control circuit 17 performs focus detection and focus adjustment with respect to the subject. More specifically, the peak value information on the high-frequency component supplied from each bandpass filter 13 and 14 is acquired and then control signals controlling the rotation direction and rotation speed of a focus motor 10 or turning on/off the motor are supplied to the motor so that the focus lens 1A is driven to a position where the peak value of high-frequency component becomes maximum.

In response to a zoom instruction, a zoom drive circuit 11 causes a zoom motor 12 to rotate. When the zoom motor 12 rotates, the zoom lens 1B moves, whereby zooming is performed.

As described above, according to the first to fourth embodiments, in a period when the photoelectric conversion unit 101 generates and accumulates charge, the charge holding unit 102 accumulates a part of the charge spilling from the photoelectric conversion unit 101. The gate of transistor Tx-MOS is a first transfer unit transferring to the source follower amplifier SF-MOS the charge accumulated in the photoelectric conversion unit 101. The gate of transistor Ty-MOS is a second transfer unit transferring to the source follower amplifier SF-MOS the charge accumulated in the charge holding unit 102. In a period when the photoelectric conversion unit 101 generates and accumulates charge, the drain portion 104 is used to drain out another part of the charge spilling from the photoelectric conversion unit 101. Charge is transferred in such a way that a path for transferring the charge accumulated in the photoelectric conversion unit 101 to the source follower amplifier SF-MOS is different from that for transferring the charge accumulated in the charge holding unit 102 to the source follower amplifier SF-MOS.

According to the second embodiment, in a period when the photoelectric conversion unit 101 generates and accumulates charge, the second charge holding unit 102b accumulates a part of the charge spilling from the first charge holding unit 102a. The gate of transistor Tz-MOS is a third transfer unit transferring to the source follower amplifier SF-MOS the charge accumulated in the second charge holding unit 102b.

By adjusting lengths L1, L2, L3, and so on, the ratio of the charge spilling from the photoelectric conversion unit 101 and flowing into the charge holding unit 102 can be controlled with high accuracy, thus extending dynamic range and at the same time improving image quality. Also, both the structure for the overflow from the photoelectric conversion unit 101 to the charge holding unit 102 and that for the overflow from the photoelectric conversion unit 101 to the drain portion 104 are of horizontal type overflow drain. Accordingly, the ratio of the amount of spilling charge between the two structures can easily be controlled.

It is to be noted that an image may be produced based on only the carrier overflowed into the storage capacitor.

The previous description is of specific examples for implementing the invention, and the technical scope of the invention should not be restrictively interpreted by the description of the embodiments. More specifically, many modifications to the embodiments described above are possible without departing from the spirit or gist of the invention.

This application claims priority from Japanese Patent Application No. 2005-008124 filed on Jan. 14, 2005, which is hereby incorporated by reference herein.

What is claimed is:

1. An image pickup device including a pixel comprising:
    a photoelectric conversion unit, which generates carriers by photoelectric conversion and accumulates a part of the carriers;
    a first capacitor, which is light-shielded, and which accumulates carriers that overflow from the photoelectric conversion unit;

an amplifying unit, which amplifies a signal based on the carriers accumulated in the photoelectric conversion unit and the carriers accumulated in the first capacitor;
a first transfer transistor, which transfers the carriers accumulated in the photoelectric conversion unit to the amplifying unit; and
a second transfer transistor, which transfers the carriers accumulated in the first capacitor to the amplifying unit,
wherein the photoelectric conversion unit and the first capacitor have a same structure,
wherein the photoelectric conversion unit includes a first semiconductor region of a first conductivity type for accumulating the carriers and a second semiconductor region of a second conductivity type disposed in a surface side of the first semiconductor region; and
wherein the first capacitor includes a third semiconductor region of the first conductivity type for accumulating a part of the carriers that overflow from the photoelectric conversion unit, and a fourth semiconductor region of the second conductivity type disposed in a surface side of the third semiconductor region.

2. An image pickup device including a pixel comprising:
a photoelectric conversion unit, which generates carriers by photoelectric conversion and accumulates a part of the carriers;
a first capacitor, which is light-shielded, and which accumulates carriers that overflow from the photoelectric conversion unit;
an amplifying unit, which amplifies a signal based on the carriers accumulated in the photoelectric conversion unit and the carriers accumulated in the first capacitor;
a first transfer transistor, which transfers the carriers accumulated in the photoelectric conversion unit to the amplifying unit;
a second transfer transistor, which transfers the carriers accumulated in the first capacitor to the amplifying unit;
a first floating diffusion region, which corresponds to the first transfer transistor, and which acts as an input of the amplifying unit; and
a second floating diffusion region, corresponds to the second transfer transistor, and which acts as an input of the amplifying unit,
wherein the first floating diffusion region and the second floating diffusion region are connected via a conductive material.

3. an image pickup device including a pixel comprising:
a photoelectric conversion unit, which generates carriers by photoelectric conversion and accumulates a part of the carriers;
a first capacitor, which is light-shielded, and which accumulates carriers that overflow from the photoelectric conversion unit;
an amplifying unit, which amplifies a signal based on the carriers accumulated in the photoelectric conversion unit and the carriers accumulated in the first capacitor;
a first transfer transistor, which transfers the carriers accumulated in the photoelectric conversion unit to the amplifying unit;
a second transfer transistor, which transfers the carriers accumulated in the first capacitor to the amplifying unit; and
an overflow drain, which discharges carriers that overflow from the photoelectric conversion unit during a period when the photoelectric conversion unit generates and accumulates carriers.

4. The image pickup device according to claim 3, wherein the first capacitor is disposed opposite to a main side of the photoelectric conversion unit, and the overflow drain is disposed opposite a side other than the main side of the photoelectric conversion unit.

5. The image pickup device according to claim 3, wherein the overflow drain is disposed between the photoelectric conversion unit and the first capacitor.

6. The image pickup device according to claim 3, wherein the photoelectric conversion unit and the overflow drain are disposed at a same depth from a main surface of a semiconductor substrate.

7. An including a pixel comprising:
a photoelectric conversion unit generating carriers by photoelectric conversion to accumulate a part of the carriers;
a first capacitor light-shielded, accumulating carriers overflowed from the photoelectric conversion unit can flow;
an amplifying unit amplifying a signal based on the carriers accumulated in the photoelectric conversion unit and the first capacitor;
a first transfer transistor transferring the carriers accumulated in the photoelectric conversion unit to the amplifying unit;
a second transfer transistor transferring the carriers accumulated in the first capacitor to the amplifying unit;
a second capacitor, which accumulates the carriers generated in the photoelectric conversion unit that overflow from the first capacitor; and
a third transfer transistor, which transfers the carriers accumulated in the second capacitor to the amplifying unit.

* * * * *